Feb. 13, 1951          H. G. BUSIGNIES          2,541,030
RADIO PULSE DISTANCE AND DIRECTION INDICATOR
Original Filed Oct. 30, 1941          2 Sheets-Sheet 1
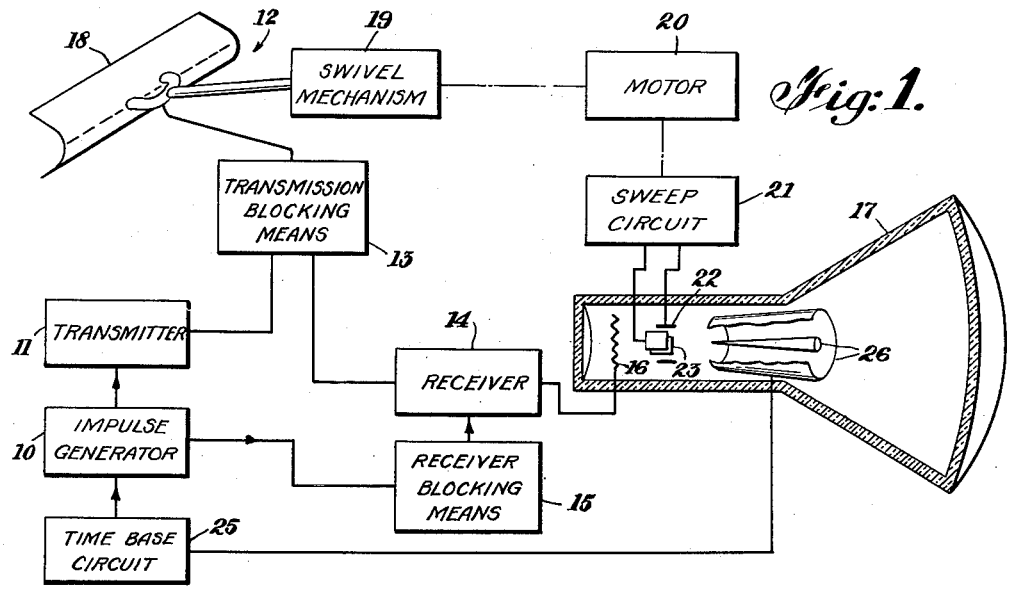
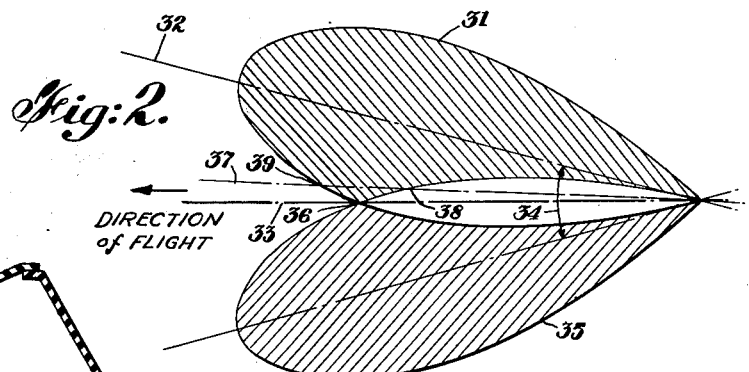
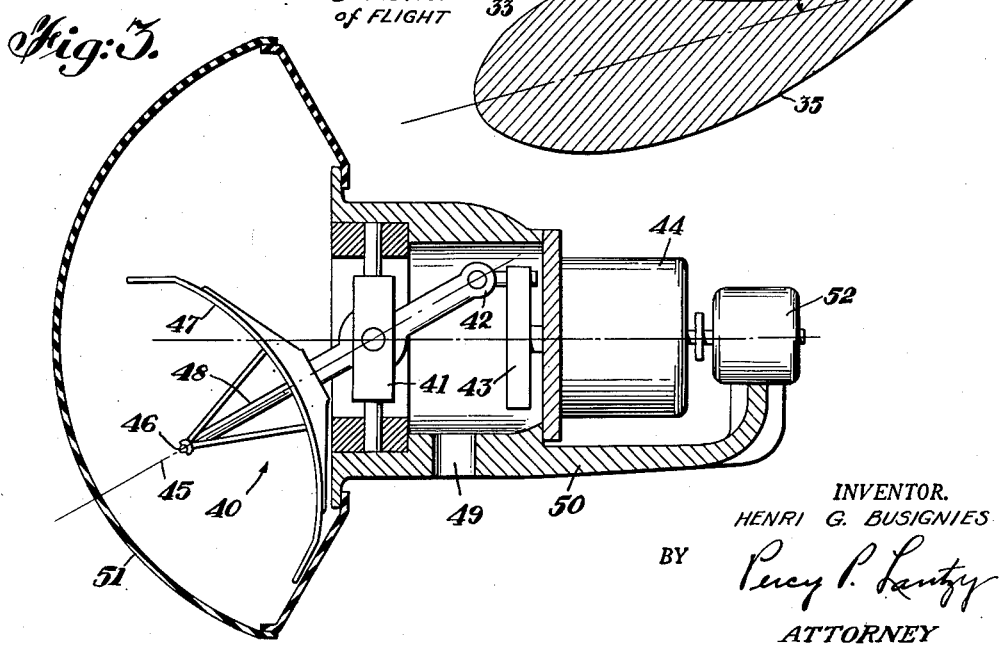
INVENTOR.
HENRI G. BUSIGNIES
BY
*Percy P. Lantzy*
ATTORNEY

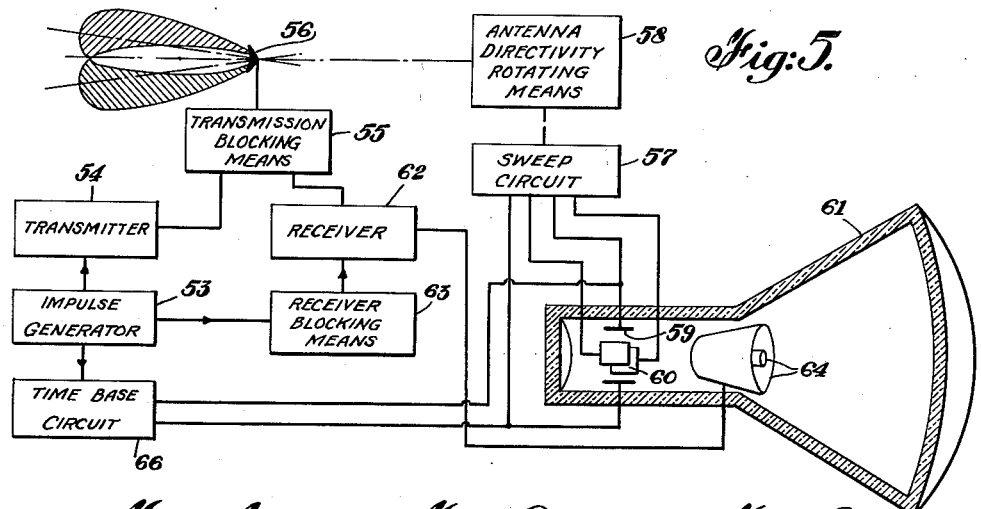
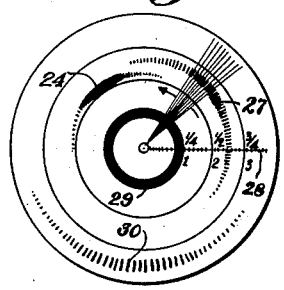
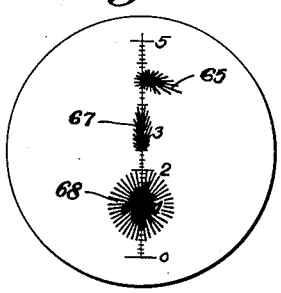
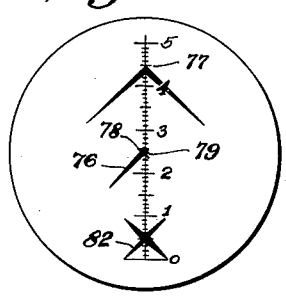
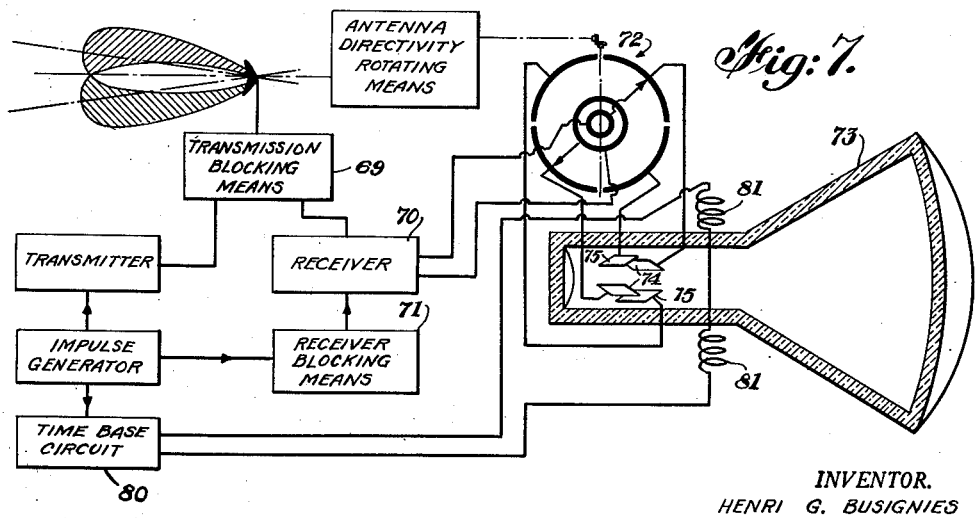

Patented Feb. 13, 1951

2,541,030

UNITED STATES PATENT OFFICE 2,541,030

RADIO PULSE DISTANCE AND DIRECTION INDICATOR

Henri G. Busignies, Forest Hills, N. Y., assignor to Federal Telephone and Radio Corporation, Newark, N. J., a corporation of Delaware Original application October 30, 1941, Serial No. 417,151. Divided and this application May 29, 1943, Serial No. 488,986

2 Claims. (Cl. 343—11)

The present invention relates to improvements in direction finding systems and more particularly to aircraft identification apparatus.

The invention is a division of my abandoned application, Ser. No. 417,151, filed October 30, 1941, entitled Aircraft Identifier.

It is a primary object of the invention to provide improved means for identifying a reflecting body within an explored field.

Another object is to provide improved means for simultaneously determining within a desired cone or other volume of exploration, the location of a plurality of reflecting bodies.

A further object is to provide improved means for indicating the relative locations of a plurality of aircraft within a desired exploration field.

A more specific object is to provide in an aircraft improved means for visually indicating to a pilot the relative locations of a plurality of enemy craft in terms of precise enough coordinates to enable him to pursue and destroy such enemy craft in succession.

A still more specific object is to provide in an aircraft identification system improved cathode ray tube indicating means whereby a plurality of aircraft may be simultaneously and accurately identified as to direction and distance.

Other objects and various further features of novelty in invention will hereinafter be pointed out or will occur to those skilled in the art, from a reading of the following specification in conjunction with the drawings included therewith.

In said drawings,

Fig. 1 is a schematic block diagram of aircraft identification apparatus in accordance with the invention;

Fig. 2 is a graphical representation of a radiation pattern in accordance with the invention;

Fig. 3 is a partially sectionalized elevation of apparatus for mechanically producing the radiation pattern of Fig. 2;

Fig. 4 is a showing of possible readings obtained with the apparatus of Fig. 1;

Fig. 5 is a schematic block diagram of further apparatus in accordance with the invention;

Fig. 6 represents a typical indication obtained from the apparatus of Fig. 5;

Fig. 7 is another schematic block diagram of still further apparatus in accordance with the invention; and Fig. 8 represents a typical indication obtained with the apparatus of Fig. 7.

In general, as will ge gathered from the above objects, the system according to the invention is especially adaptable in the identification of enemy aircraft, particularly when the latter is not visible. The apparatus is preferably installed complete on a fighter plane, and the polar coordinates of any enemy craft within the field of the apparatus are clearly indicated by signal indications on a cathode ray tube screen preferably included on the dash board equipment.

In accordance with the invention, then, two kinds of information are simultaneously obtained concerning any aircraft within the exploration field; namely, distance and direction of such craft. In order to obtain these indications, I propose to set up a rotating radiation search pattern, the instantaneous directivity of which describes a generally conical orbit throughout the cone of desired exploration. Modulating such radiation, I propose to transmit a series of periodically recurrent extremely short impulses characterized by relatively high instantaneous power. For best resolving power I prefer a high plurality of such impulses for each rotation of the radiation throughout the conical orbit. It is clear that in a system, as the directivity of radiation nears a reflecting body, successive impulses will be reflected back in increasing magnitude culminating in a maximum at the instant that the radiation is most nearly directed at the reflecting body. In accordance with the invention, the receiving equipment is responsive to such reflected impulse energy and provides an output indicative of the magnitude of the individual reflected impulses. Then, for example by synchronizing a circular sweep circuit in a cathode ray indication device with the rotation of radiation and superimposing upon such sweep circuit energy control further control responsive to the magnitude of received impulses, an indication of direction may be obtained.

In order to obtain an indication of how far away the reflecting body is, I provide means for measuring the time interval between the transmission of a particular impulse and the instant at which a reflection of that impulse is received. This means comprises, in a preferred form, an additional sweep or time base circuit, together with appropriate electrode means within the cathode ray indicator for regularly applying deflecting potentials to sweep the electron beam across the screen of the indicator tube at a calibrated speed and in synchronism with the recurrence of transmitted impulses. Depending therefore, upon the delay occasioned in transmission and reflection of a particular impulse, this impulse would be recorded upon a spot on the indicator tube displaced a definite amount from the origin of the delay time base sweeping operation. Thus, it is possible in accordance with the invention, to obtain a single indication of the distance and direction of a reflecting object within the field of exploration of the apparatus.

More specifically, and turning to a preferred embodiment of the invention, as illustrated in Fig. 1, impulse energy to be radiated is generated by an impulse generator 10. In a well known manner, such impulse energy may modulate a carrier in transmitter 11, whereupon such energy is fed to radiating means designated generally as 12. Radiating means 12 is preferably normally directive and is operative to radiate impulse energy fed thereto throughout a generally conical orbit. A preferred form of radiating means 12 will hereinafter be described in connection with Figs. 2, and 3.

For the sake of simplicity in installation, I prefer to employ the same antenna structure for radiation and reception of energy. It is to be understood, however, that separate elements may be utilized for these purposes. In the form shown in Fig. 1, a single antenna structure serves both these functions, and accordingly, it is considered necessary to provide transmission blocking means 13 in the line connecting the transmitter 11 to the antenna to ensure that transmitted energy is wholly transmitted and not diverted into receiver 14, which must likewise be connected to the antenna through transmission blocking means 13. Since received energy will always be displaced in time with respect to transmitted energy, that is, received impulses will be intermediate transmitted impulses, in view of the radiation reflection delay, transmission blocking means 13 may comprise suitable well known contacting or relay means such as, for example, an electronic relay for alternately connecting the transmitter 11 and receiver 14 to the antenna.

Inasmuch as the magnitude of transmitted energy is necessarily many times greater than that of received energy, it is deemed advisable to provide additional means for assuring that transmitted impulse energy will not be effective in the receiver so as to disturb operation of the same. Such additional means may comprise, for example, a circuit 15 for delivering blocking pulses to the receiver responsive to the impulses generated by generator 10 thus rendering receiver 14 inoperative for the duration of such impulses. Such a circuit for delivering blocking pulses is well known.

Receiver 14 preferably includes well-known means for obtaining an output indicative of the relative magnitude of successive received impulses. In the circuit shown in Fig. 1, such received and detected impulse energy is applied to a grid 16 in a cathode ray indicator device 17. Grid 16 is preferably so biased that cathode ray tube 17 will not generate a beam unless an impulse of sufficient magnitude is applied to grid 16. Thus, a plurality of successive spots may be formed on the fluorescent screen of tube 17 when there is a reflecting body in the field of antenna means 12; and these spots will vary in degree of brightness, increasing as the directivity of antenna 12 approaches the reflecting body, and decreasing as this directivity draws away from the reflecting body.

Thus far, only sufficient apparatus has been described to produce spots of varying intensity on the same portion of the fluorescent screen of tube 17. These spots must be somehow "fanned out," or otherwise displaced from each other, so as to give an indication of the direction of the reflecting object. In the form shown in Fig. 1, antenna means 12 comprises a directional radiator 18 and means for mechanically displacing radiator 18 so as to be directive throughout a generally conical orbit. Appropriate mechanical displacement may be obtained by swivel mechanism 19 propelled by a motor 20. A well known circular sweep circuit 21 may be synchronized in its operation with the rotation of motor 20, and hence of the directivity of antenna 18. Output energy from sweep circuit 21 may then, in a well known manner, be applied to horizontal and vertical deflection means 22, 23 associated with cathode ray tube 17. In this manner, a field may be set up within the neck of the indicating tube, which field may rotate in synchronism with rotation of the directivity of antenna 18.

Now, considering the simultaneous operation of the grid 16 and deflection means 22, 23, it will be appreciated that a directional indication of the location of the reflecting object will thereby be obtained on the screen of the indicator tube. This indication will comprise for each reflecting body a series of spot indications displaced along an arc of a circle and varying from zero to maximum brightness and back to zero within that arc. It is clear that, by visualizing a line drawn from the center of the screen of indicating tube 17 through the point of maximum brightness in such an arc, an accurate indication of the direction of the reflecting body may be obtained. Such an arc is shown, for example, in Fig. 4. Considering the arc 24, this indication may represent an enemy craft generally above and slightly to the left of the direction of flight of the fighter carrying the indicating equipment if the axis of the conical orbit of radiation of antenna 18 is aligned with the direction of flight, as will be clear.

It will be appreciated that thus far only sufficient means have been described to give an indication of the direction of reflecting bodies. Some means must now be provided for also indicating the relative distances to these objects. In the form shown in Fig. 1, this additional means comprises a time base or sweep circuit 25 which may, for example, generate a saw-tooth wave pattern in synchronism with impulses generated by generator 10. In accordance with a preferred method, such time base energy is applied to radial deflection means 26 associated with the cathode ray indicating device. In the form shown, the radial deflection means comprises a pair of coaxial conic electrode structures which may be of the form described in a copending application Serial No. 401,740, filed by Georges P. Chevigny and me on July 10, 1941, now Patent No. 2,412,965. Preferably, the energy supplied by time base circuit 25 is applied to radial deflection means 26 in such a manner that deflecting potentials set up an electrostatic field periodically progressing radially outwardly of a point disposed generally centrally on the screen of tube 17. It is clear that the effect of additional deflection means 26 is to locate the received arcs as set up by grid 16 and sweep circuit deflection means 22, 23 at radii corresponding to the delay between a transmitted impulse and a received reflection of such impulses. A plurality of reflecting bodies displaced different distances from the plane carrying the indicating apparatus will be identified by the apparatus as a series of radially displaced arcs, such radial displacement being in proportion to the relative distances of these reflecting bodies from the point of observation.

A typical reading for indicating apparatus in accordance with Fig. 1 in which a plurality of aircraft are identified within the field of exploration, is shown in Fig. 4. From the above discussion, it will be appreciated that indication 27 may represent an aircraft generally to the right and above the line of flight of the fighter plane. Indication 24 has already been discussed, and it will be seen that of the two craft identified by marks 24 and 27, the former is closer because spaced less radially from the center of the indicating screen. The fact that the closer arc 24 is far smaller than the outer arc 27 may indicate that the latter represents a larger aircraft, say a bomber, and the former an escorting fighter. For convenience, a radial scale 28 may be calibrated on the screen of the tube, and this may be adapted to show, for example, distance in miles. It is clear that as the pursuing ship approaches a foe to engage in combat, a more accurate indication may be desired. To this end, switching means, not shown, may be provided, for example in connection with time base circuit 25, for rendering its radial sweeping action more rapid, and hence, effectively magnifying radial displacements on the screen of the indicating tube. Of course, additional calibrations in fractions of a mile, for example, may be provided on the tube for the case when the magnification circuit of time base circuit 25 is employed, as will be clear.

As the fighter pilot maneuvers his plane to make his line of flight correspond with a reflecting body, it is clear that the directivity indication will be less and less distinct in that the indication arc will be increased to extend more and more around the screen. When he is directed precisely towards the enemy craft, the arc nature of the indication will develop into a complete circle of uniform intensity, and all the pilot has to do is to continue along this direction as the radius of the observed circle decreases to within firing range. Circle 29 in Fig. 4 illustrates such a case in which an enemy craft is directly ahead, either one mile or a quarter of a mile, depending on whether or not the magnification elements in time base circuit 25 are switched in or out. The large arc indication 30 at the bottom of the screen of Fig. 4 is indicative of the earth's reflection, as will be clear.

Turning now more specifically to a preferred form of apparatus for generating a directive radiation pattern and sweeping the same through a generally conical orbit, reference may be had to Figs. 2 and 3. For purposes that will later become apparent, I prefer to employ an antenna network having a generally lobe-shaped directive pattern of generally circular cross section. Such a pattern is represented by lobe 31 in Fig. 2 and has an axis of symmetry 32. In accordance with the invention, I propose to rotate axis 32 throughout a generally conical orbit about an axis of rotation 33. The apex angle 34 of the conical orbit is preferably such that the shape of pattern 31 in one position will overlap itself in a diametrically opposed position 35, and the intersection 36 defining such overlapping will represent a maximum difference in slope of the pattern at these two extreme positions. It is clear that my preference for a maximum slope difference at this point is to permit highest indication accuracy when the observed plane is in proximity to the line of flight of the pursuit ship. It will be appreciated that this high accuracy is obtained by the relatively great displacement between pattern 31, 35 for slight angular displacements from axis of rotation 33. To illustrate, assume for example, that the observed enemy craft is very nearly along the axis of flight 33, but slightly displaced therefrom, say along an axis 37. This axis 37 intercepts the wave pattern throughout its complete rotation and thus will produce a circular indication upon the screen of the indicating tube. However, it is to be noted that intercepts 38 (of axis 37 with the radiation pattern at position 35) and 39 (of axis 37 with the radiation pattern at position 31) are so well displaced with respect to each other that a very distinct difference in voltage may be discerned between these two positions. The circle will thus appear to be relatively dim all around, except for a small arc of relatively great brilliance, the center of which arc will define the direction of axis 37. If necessary, it is clear that amplitude limiter means could be provided in receiver 14 passing only the most intense received impulse energy to grid 16. In this manner, a better defined arc could be obtained to identify course 37, as will be clear.

In Fig. 3, I show a preferred form of mechanical device for providing the radiation pattern described in connection with Fig. 2. This device comprises a directive antenna structure 40 pivoted in a swivel joint 41 and adapted for rotation by means of a universal joint 42. Joint 42 may be carried by a crank 43 which is suitably rotated by motor means 44. For a purpose later to be described, swivel joint 41 permits a merely mechanical circular displacement of antenna 40 without rotating the latter, that is, merely a resultant of upward, downward, and sideward displacement is imparted to antenna 40 without rotating the same about its axis of symmetry 45.

Antenna 40 in the form shown comprises longitudinally extending radiating means disposed generally along the focal axis of a generally cylindrical parabolic reflecting member 47. It is well known that by appropriately proportioning the axial dimensions of radiator 46 and reflector 47 with respect to each other and with respect to the carrier wave length employed, a generally lobe-shaped beam of circular cross section may be obtained with high radiating efficiency. Leads for energizing radiating means 46 may be suitably fed in the conventional manner through a shield in line 48 extending through the support for antenna 40, and inasmuch as this structure does not itself rotate about axis 45, the antenna leads (not shown) may be brought directly out through an aperture 49 in the housing 50 of the device.

I consider it preferable not to rotate antenna 40 about its own axis 45 during the generally conical displacement action of rotation of crank 43 for the reason that magnetic and electric vector polarization of waves radiated by antenna 40 may thus be maintained in the same general sense and phase relationship, regardless of the instantaneous position of antenna 40 in its circular orbit. It is considered that if rotation of antenna 40 about its own axis 45 were permitted during the sweep through the conical orbit, received reflections of impulse returning from different reflecting bodies may be erroneously displaced with respect to each other, due to a rotation of the magnetic and electric vector polarizations. The device shown in Fig. 3 is considered to be particularly adaptable to twin-engined aircraft, in that it may be installed in the nose of the fuselage. In that event, a protective cover 51 of non-conductive material may be provided in front of the moving radiating elements without interfering appreciably with the performance thereof. The device shown in Fig. 3 further illustrates that the generator 52 may be directly coupled to motor 44 and serve the purposes of sweep circuit 21 in Fig. 1.

Although I have described my means for seting up a directive radiation sweeping throughout a conical orbit as being produced by a mechanical structure as shown in Fig. 3, it is to be understood that other means may be used for setting up such a directive pattern. For example, in an abandoned application of mine, entitled Directive Antennas, filed on October 30, 1941, Serial No. 417,152, I show how such a field may be set up with parts that are entirely stationary. According to the disclosure of that application, a radiating element is suitably disposed with respect to a chamber containing an ionizable medium, and electrode means are provided for locally ionizing the ionizable medium. By appropriate successive energization of these electrodes, the ionizing field may be made to rotate and thus act as a rotating reflector to direct radiation throughout a generally conical orbit in the same way that this radiation may be directed by the structure shown in Fig. 3. The above-mentioned copending application also discloses that in an alternative method, the envelope containing the ionizable medium may be disposed in front of a directive antenna structure, and the electrodes associated with the envelope may be suitably energized to rotate an ionized field and thus successively block out portions of the radiation of the directive antenna structure. In this way, a rotating radiation pattern of the said character is also set up.

In Figs. 5 and 6, I illustrate an alternate preferred form of obtaining cathode ray indications of distance and direction with the rotating radiation pattern according to the invention. As in the case of the circuit shown in Fig. 1, impulses are supplied from an impulse generator 53 to modulate a carrier in transmitter 54. Transmitter 54, by means of transmission blocking means 55 suitably synchronized therewith, feeds impulse energy to rotating directive antenna unit 56 which produces a rotating radiation pattern of the same general nature as disclosed above. A sweep circuit 57 synchronized with rotation of antenna directivity rotating means 58 again supplies energy to the pairs of deflection means 59, 60 of cathode ray indicating tube 61. In this manner, it will be recalled, a rotating electrostatic field is set up within the indicating tube in synchronism with rotation of antenna 56.

Again, in the circuit of Fig. 5 receiver 62 is protected from disturbing effects of transmitted impulses by means of the transmission blocking means 55 and blocking circuit 63, both of which have been adequately described above in connection with the circuit of Fig. 1. Again the output of receiver 62 is a succession of uni-directional impulses varying in magnitude with the degree of instantaneous reflection of transmitted impulses. However, in accordance with the form shown in Fig. 5, I employ this output in receiver 62 to modulate the effect of the rotating sweep circuit potentials applied by sweep circuit 57 to deflection means 59 and 60. Thus, this modulating effect may be obtained, for example, by supplying the output of receiver 62 to radial deflection means 64 as, for example, described above in connection with Fig. 1. It will be understood that the effect of simultaneous operation of sweep circuit 57 and receiver 62 connected in the manner described will be to produce a small nest of angularly displaced lines radially extending from a point on the screen of indicating tube 61. The respective lengths of these lines will, of course, vary in accordance with the magnitude of the successive impulses detected by receiver 62. Thus, an indication of general direction may be obtained. With reference to Fig. 6, and considering the nest of lines 65, it will be appreciated that the general direction of the reflecting body indicated thereby is to the right and slightly below the line of flight of the pursuing ship.

It is proposed that in connection with the indicating system discussed to far in Fig. 5, a linear distance indication scale be employed. As in the case of the circuit of Fig. 1, an appropriate time base circuit 66 may generate say, saw-tooth energy for applying an additional deflection field running generally transverse of the tube. In the form shown in Fig. 5 and Fig. 6, the direction of this field runs from the bottom of the tube screen up, and this additional deflection energy may be therefore superimposed as shown upon the vertical deflection means 59 which is also employed in connection with output energy from sweep circuit 57. If such a connection is employed, it is to be understood, of course, that appropriate rectifier means are included within time base circuit 66 whereby sweep circuit energy from 57 is prevented from dissipation in time base circuit 66, as will be clear. A distance scale may be graduated in common linear measurement units, for example, miles, and may appear as shown in Fig. 6.

Considering the typical indications obtained on the screen shown in Fig. 6, nest of lines 65 represents a craft sighted approximately 4.2 miles away, to the right, and slightly below the pursuit ship's line of flight. Nest 67 indicates a closer aircraft generally in the line of flight; however, slightly above and approximately 2.7 miles distant.

The pilot's procedure in pursuing one of these objects will be to try to obtain as nearly uniform a nest as possible—that is, he will try to make all the radial lines substantially equal and pursue in this manner, watching the nest descend down the scale to a position, as for example 68, shown.

Still another preferred form of indicating the distance and direction of enemy craft within the cone of exploration of my novel radiation pattern is shown in Figs. 7 and 8. In this case, the same or analogous means may be employed for transmitting the impulses in the novel directive manner. However, the manner of indication is quite different. Again, received reflected energy is passed through transmission blocking means 69 to a receiver 70 which is also suitably blocked with respect to transmitted impulses by means of a blocking circuit 71. Instead of employing a circular sweep circuit, as in the previous two cases discussed, I propose the use of a contactor or commutating means 72 synchronized with rotation of the antenna directivity rotating means. In the form shown two pairs of conventional deflection plates 74, 75 are shown disposed in the neck of the cathode ray indicating tube 73 and each of these plates is connected to a conductive segment of commutating means 72. Commutating means 72 preferably comprises two contact arms insulated from one another and simultaneously contacting diametrically opposed segments thereof. It will be recalled that output of receiver 70 is a series of uni-directional impulses varying in magnitude with the instantaneous degree of reflection of transmitted impulse energy. This output is in the form shown applied between the contact arms of commutating means 72, and thus at any instant is applied in a definite polarity relation between the respective elements of one of the pairs of deflection plates 74 or 75. Thus, while commutating means 72 is contacting the segments shown, the potentials applied between deflection plates 74 will be uni-directional throughout the entire quadrant. In the next quadrant of contacting, detected impulse energy will be applied in one polarity sense between the elements of deflecting plates 75, as will be clear. In the quadrant following, received reflected energy will be applied again between deflection plates 74 but in a reverse polarity sense. The next quadrant of contact will again apply potential between plates 75, but this time also in a reversed polarity sense. The cycle thereafter repeats itself, as will be clear.

The effect of the above described application of potentials to deflection plates 74 and 75 of indicating tube 73 will be to describe at a point on the screen of tube 73 a small X-shaped pattern for each reflecting object. Referring to Fig. 8, let us consider the received indicating pattern 76. This pattern, it will be noted, is characterized by a marked distention to the left and below the center of the pattern. Such a distention should be interpreted as indicating a reflecting object in that general direction, inasmuch as the two arms 79, 78 of the pattern are of approximately equal lengths, thus indicating equal reflected energy in those quadrants, as will be clear.

In connection with the latter form of indicating system, I consider it preferable to use a linear distance-indicating scale as described, for example, in connection with the system of Figs. 5 and 6. Appropriate saw-tooth sweep energy for this purpose may be derived from the impulse generator and a saw-tooth wave generating circuit 80 and applied to deflection means 81 associated with indicating tube 73. For purposes of clarity in obtaining the sense indication of the cross-shaped patterns on the screen of tube 73, I prefer that the axis of reflection means 81 be intermediate and preferably bisecting the angle between the axes of deflection means 74 and 75. As in the case of the system of Figs. 5 and 6, a linear distance scale may again be calibrated on the surface of the screen of the tube, in miles for example. Thus, indication pattern 76 indicates an enemy craft just short of 2.5 miles away and pattern 82 describes a craft just over one-half mile away and directly in the line of flight. The large inverted V shape 7 at the top of the scale will probably be the most common appearance on the screen of the tube and indicates reflection from the earth ahead and below the line of flight; in the case shown, about 4.5 miles away.

Although my invention has been described in particular in connection with antenna structures acting as transmitting and receiving atennas simultaneously, it is to be understood that other forms may be employed. For example, the directive antenna structures described may be employed only for transmission and a simple non-directive separate unit used for reception. Alternately, equally satisfactory results may be obtained from a system in which the transmitting antenna is fixed and either non-directive or generally directive in the direction of exploration. In this latter case receiving antenna means according to any of the forms described and synchronously connected as shown would furnish all the desired information for successfully operating any one of the systems described.

It will be understood that the above disclosed methods and systems are not merely applicable to the detection of aircraft from aircraft, but may be also employed in connection with anti-aircraft battery gunfire control and many other peace time applications that will naturally occur to those skilled in the art. Although most of the deflection means shown in the cathode ray indicating tubes are electrostatic, it is to be understood of course, that magnetic or other known methods may be employed for the purpose. Furthermore, the particular types of electrodes and their structures are not to be construed as limiting the scope of the methods and systems disclosed herein.

What I claim is:

1. In an object detection system in which periodically recurrent impulse energy is directionally radiated in a generally circular sweep, receiver means responsive to reflections of said impulse energy for indicating the direction and distance of reflecting objects, said receiver means including cathode ray indicating means including radial deflection electron beam control means for producing a radial trace of a length determined by the magnitude of received energy, deflection means for producing a deflection corresponding to the delay between a transmitted impulse and a received reflection thereof, and angular sweep deflection means operatively synchronized with the circular sweep of said radiation, said deflection means including means displacing the electron beam of said cathode ray indicating means generally diametrically across said indicating means, said displacing means operating in synchronism with the frequency of said periodic recurrence.

2. In an object detection system in which periodically recurrent impulse energy is directionally radiated in a generally circular sweep, receiver means responsive to reflections of said impulse energy for indicating the direction and distance of reflecting objects, said receiver means including a cathode ray indicating device having a generally circular sweep deflection means, a radial deflection means and a diametrical deflection means, means for operating said circular sweep means in synchronization with said generally circular sweep of said directional radiation, means coupled to said diametrical deflection means for producing a deflection corresponding to the delay between the instant of transmitting an impulse and the instant of receiving a reflection of said impulse, means for energizing said radial deflection means in accordance with the magnitude of received signals, and means in said cathode ray device responsive to received impulse energy for providing an indication of the direction and distance of said reflecting objects in accordance with the position of the cathode ray beam under control of said deflection means.

HENRI G. BUSIGNIES.

(References on following page)

REFERENCES CITED

The following references are of record in the file of this patent:

UNITED STATES PATENTS

| Number | Name | Date |
|---|---|---|
| 2,083,242 | Runge | June 8, 1937 |
| 2,200,745 | Heymann | May 14, 1940 |
| 2,231,929 | Lymann | Feb. 18, 1941 |
| 2,300,189 | Wolff | Oct. 27, 1942 |
| 2,412,702 | Wolff | Dec. 17, 1946 |
| 2,412,703 | Wolff | Dec. 17, 1946 |

FOREIGN PATENTS

| Number | Country | Date |
|---|---|---|
| 497,147 | Great Britain | Dec. 9, 1938 |
| 520,778 | Great Britain | May 3, 1940 |